(12) United States Patent
Sahni et al.

(10) Patent No.: US 10,469,195 B2
(45) Date of Patent: Nov. 5, 2019

(54) METHOD AND SYSTEM FOR ELIMINATING POLARIZATION DEPENDENCE FOR 45 DEGREE INCIDENCE MUX/DEMUX DESIGNS

(71) Applicant: Luxtera, Inc., Carlsbad, CA (US)

(72) Inventors: Subal Sahni, La Jolla, CA (US); John Andrew Guckenberger, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 16/158,001

(22) Filed: Oct. 11, 2018

(65) Prior Publication Data

US 2019/0115995 A1   Apr. 18, 2019

Related U.S. Application Data

(60) Provisional application No. 62/571,561, filed on Oct. 12, 2017.

(51) Int. Cl.
*H04J 14/06* (2006.01)
*G02B 6/27* (2006.01)
(Continued)

(52) U.S. Cl.
CPC ............ *H04J 14/06* (2013.01); *G02B 6/2706* (2013.01); *G02B 6/2773* (2013.01);
(Continued)

(58) Field of Classification Search
CPC ........ H04J 14/06; H04J 14/02; G02B 6/2706; G02B 6/272; G02B 6/2773;
(Continued)

(56) References Cited

U.S. PATENT DOCUMENTS 4,671,613 A * 6/1987 Buhrer ................. G02B 6/2817
359/485.03
6,862,383 B2 * 3/2005 Kikuchi ................ G02B 6/327
385/33
(Continued)

OTHER PUBLICATIONS

Notification of Transmittal of the International Search Report and the Written Opinion of the International Searching Authority, or the Declaration, for International Application No. PCT/US2018/055601, International Filing Date Oct. 12, 2018, dated Dec. 27, 2018.

*Primary Examiner* — Hibret A Woldekidan
(74) *Attorney, Agent, or Firm* — McAndrews, Held & Malloy

(57) ABSTRACT

Methods and systems for eliminating polarization dependence for 45 degree incidence MUX/DEMUX designs may include an optical transceiver, where the optical transceiver comprises an input optical fiber, a beam splitter, and a plurality of thin film filters coupled to a photonics die. The thin film filters are arranged above corresponding grating couplers in the photonics die. The transceiver may receive an input optical signal comprising different wavelength signals via the input optical fiber, split the input optical signal into signals of first and polarizations using the beam splitter by separating the signals of the second polarization laterally from the signals of the first polarization, communicate the signals of the first polarization and the second polarization to the plurality of thin film filters, and reflect signals of each of the plurality of different wavelength signals to corresponding grating couplers in the photonics die using the thin film filters.

49 Claims, 12 Drawing Sheets

(51) Int. Cl.
*G02B 6/293* (2006.01)
*G02B 6/30* (2006.01)
*G02B 6/34* (2006.01)
*H04B 10/25* (2013.01)
*H04B 10/40* (2013.01)
*H04J 14/02* (2006.01)

(52) U.S. Cl.
CPC ....... *G02B 6/2938* (2013.01); *G02B 6/29362* (2013.01); *G02B 6/30* (2013.01); *G02B 6/34* (2013.01); *H04B 10/25* (2013.01); *H04B 10/40* (2013.01); *H04J 14/02* (2013.01)

(58) Field of Classification Search
CPC .... G02B 6/29362; G02B 6/2938; G02B 6/30; G02B 6/34; G02B 6/29395; G02B 2006/12109; H04B 10/40; H04B 10/25
USPC ... 398/65, 68, 79, 85, 86, 87, 152, 135, 139
See application file for complete search history.

(56) References Cited

U.S. PATENT DOCUMENTS

| | | | | |
|---|---|---|---|---|
| 6,909,549 | B1 * | 6/2005 | Hsieh | G02B 6/2713 359/489.07 |
| 9,585,556 | B2 * | 3/2017 | Buckland | A61B 3/102 |
| 9,829,637 | B2 * | 11/2017 | Chen | G02B 6/2938 |
| 10,050,713 | B2 * | 8/2018 | Li | H04B 10/532 |
| 2002/0176135 | A1 * | 11/2002 | Boord | G02B 6/272 398/87 |
| 2004/0101247 | A1 * | 5/2004 | Chen | G02B 6/29367 385/47 |
| 2006/0051030 | A1 * | 3/2006 | Lee | G02B 6/12007 385/88 |
| 2016/0036550 | A1 * | 2/2016 | Welch | H04J 14/02 398/87 |
| 2017/0146736 | A1 * | 5/2017 | Verslegers | G02B 6/124 |
| 2017/0242206 | A1 * | 8/2017 | Chen | G02F 1/09 |
| 2019/0052362 | A1 * | 2/2019 | Peterson | G02B 5/20 |
| 2019/0052391 | A1 * | 2/2019 | Peterson | G02B 6/29344 |
| 2019/0113687 | A1 * | 4/2019 | Wang | G02B 6/29367 |

\* cited by examiner

METHOD AND SYSTEM FOR ELIMINATING POLARIZATION DEPENDENCE FOR 45 DEGREE INCIDENCE MUX/DEMUX DESIGNS

CROSS-REFERENCE TO RELATED APPLICATIONS/INCORPORATION BY REFERENCE

This application claims priority to and the benefit of U.S. Provisional Application No. 62/571,561 filed on Oct. 12, 2017, which is hereby incorporated herein by reference in its entirety.

FIELD

Aspects of the present disclosure relate to electronic components. More specifically, certain implementations of the present disclosure relate to methods and systems for eliminating polarization dependence for 45 degree incidence MUX/DEMUX designs.

BACKGROUND

Conventional approaches for multiplexing and demultiplexing may be costly, cumbersome, and/or inefficient—e.g., they may be complex and/or time consuming, and/or may have limited responsivity due to losses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for eliminating polarization dependence for 45 degree incidence MUX/DEMUX designs, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
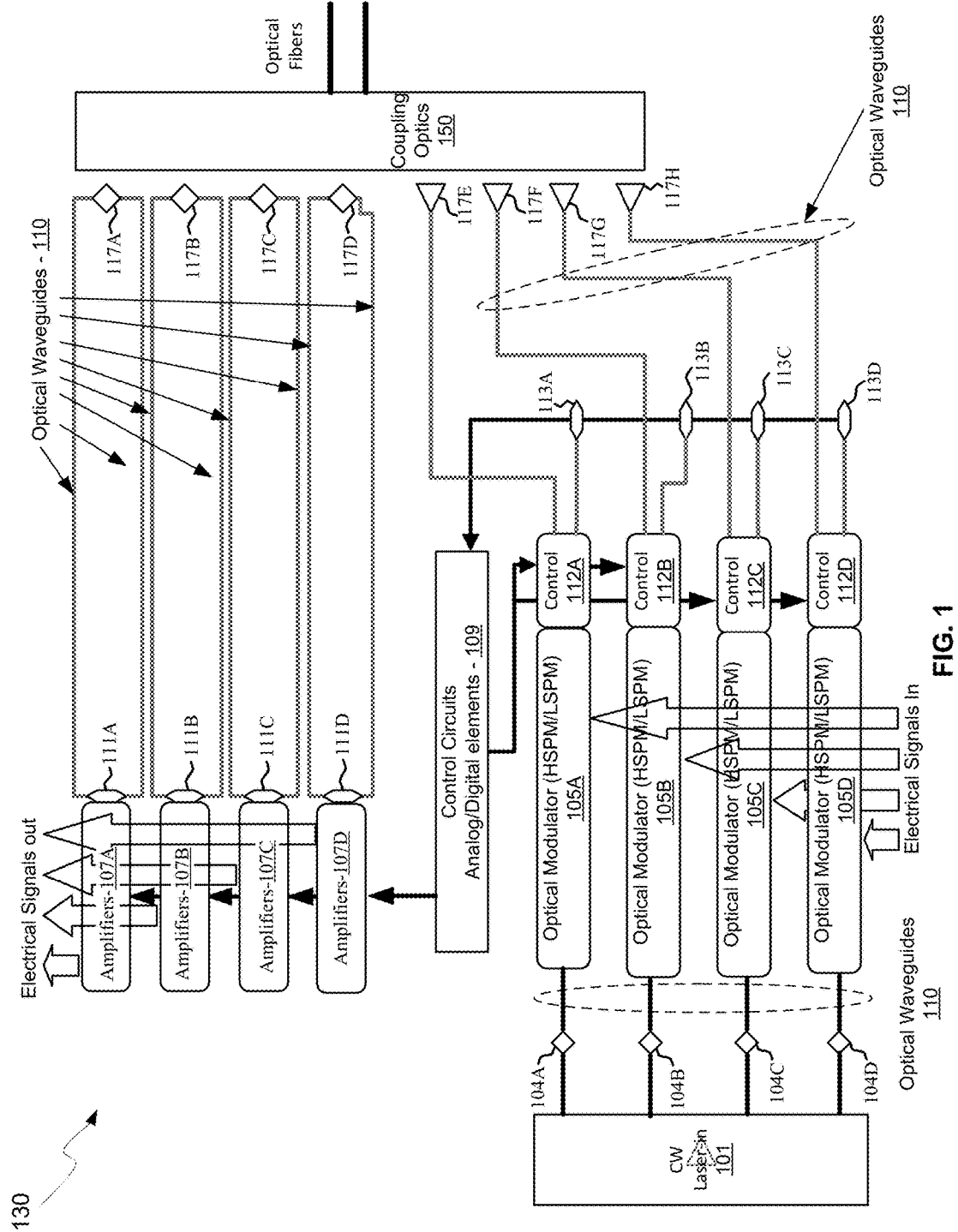
FIG. 1 is a block diagram of a photonically-enabled integrated circuit with polarization independent MUX/DEMUX, in accordance with an example embodiment of the disclosure.

FIG. 1 is a block diagram of a photonically-enabled integrated circuit with polarization independent MUX/DEMUX, in accordance with an example embodiment of the disclosure. Referring to FIG. 1, there are shown optoelectronic devices on a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example. Coupling optics 150 may comprise beam splitters, thin film filters, mirrors, prisms, etc.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the couplers 104A-104D. The CW optical signals may be at different wavelengths for CWDM operation, such as CWDM 4, for example. The photonically enabled integrated circuit 130 may comprise a single chip, or may be integrated on a plurality of die, such as with one or more electronics die and one or more photonics die.

The grating couplers 104A-104D comprise grating structures with grating spacing and width configured to couple optical signals of a specific wavelength and polarization into the IC 130. A lens array may be incorporated between the grating couplers 104A-104D and the laser assembly 101 for focusing of the optical signal to the grating couplers for increased coupling efficiency.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signals. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 104A-104D and 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 104A-104D and 117A-117H may comprise single polarization grating couplers (SPGC) and/or polarization splitting grating couplers (PSGC). In instances where a PSGC is utilized, two input, or output, waveguides may be utilized, as shown for grating couplers 117A-117D, although these may instead be SPGCs.

The optical fibers may be epoxied, for example, to the CMOS chip, using a fiber coupler that selectively deflects optical signals of different wavelengths to and from different grating couplers on the chip 130, with each coupler, such as each of the grating couplers 117A-117H being configured to couple optical signals of different wavelengths.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters 103A-103C. The optical modulators 105A-105D may require high-speed electrical signals to modulate the refractive index in respective branches of a Mach-Zehnder interferometer (MZI), for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip or a plurality of chips in a flip-chip bonded structure. An optical transceiver contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

An important commercial application of silicon photonics is high speed optical transceivers, i.e., ICs that have optoelectronic transmission (Tx) and receiving (Rx) functionality integrated in the same chip or a plurality of bonded chips in a small package. The input to such an IC or ICs is either a high speed electrical data-stream that is encoded onto the Tx outputs of the chip by modulating the light from a laser or an optical data-stream that is received by integrated photo-detectors and converted into a suitable electrical signal by going through a Trans-impedance Amplifier (TIA)/Limiting Amplifier (LA) chain. Such silicon photonics transceiver links have been successfully implemented at baud-rates in the tens of GHz.

One method for increasing data rates in optical transceivers is to multiplex a plurality of optical signals at different wavelengths for concurrent transmission through the optical fiber, which may then be demultiplexed at the receiving end. To this end, multiplexers and demultiplexers (MUX/DEMUX) may be utilized to combine/separate the different optical wavelengths. This may be accomplished with thin film filters (TFFs) tuned to different wavelengths, deflecting optical signals down to near-normal incidence on the chip into corresponding grating couplers while allowing other wavelength signals to pass through. These structures are shown in FIG. 1 as coupling optics 150 and in further detail with respect to FIGS. 2-12.

Figure 2:
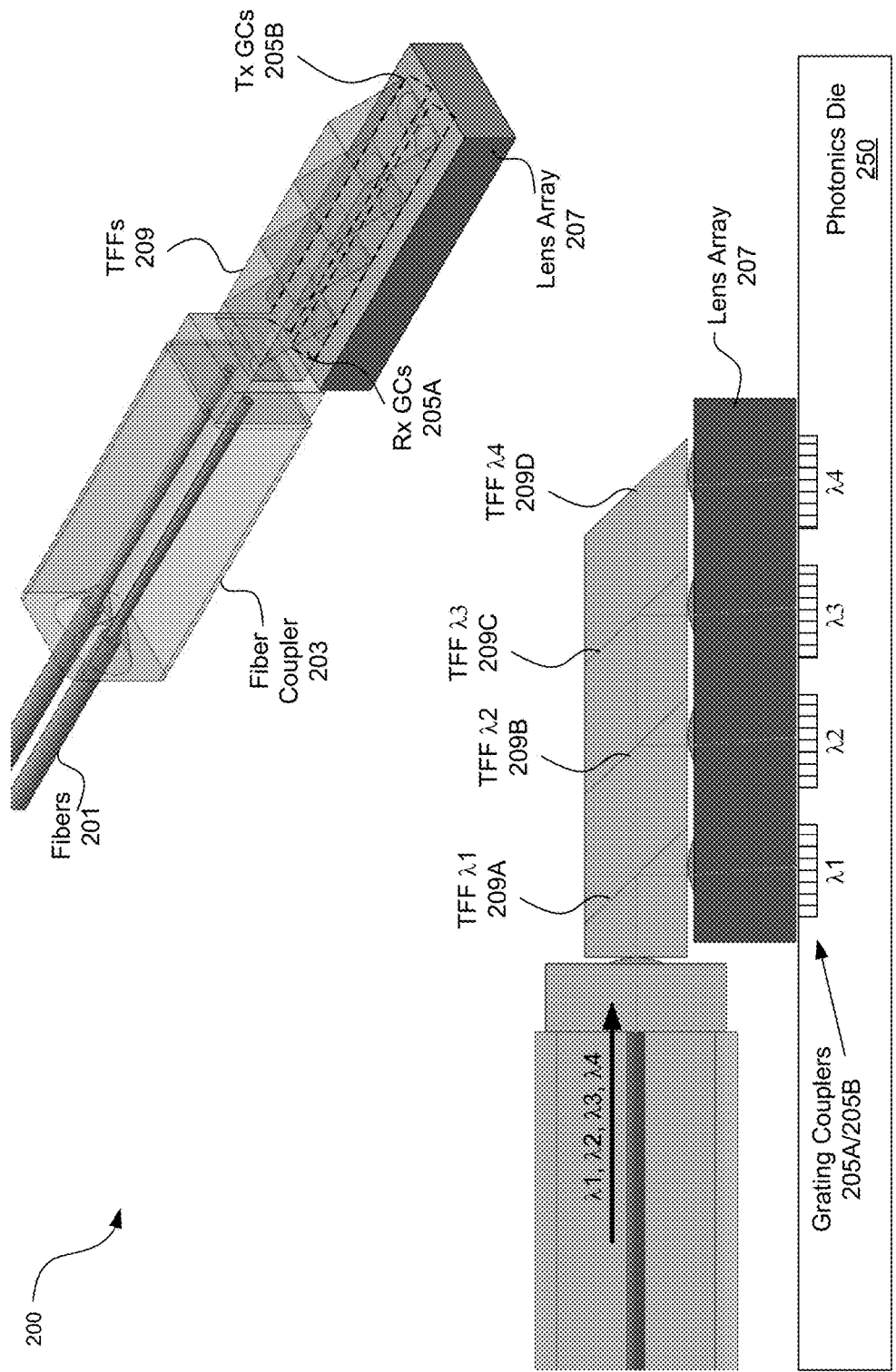
FIG. 2 is a schematic illustrating a MUX/DEMUX with thin film filters, in accordance with an embodiment of the disclosure.

FIG. 2 is a schematic illustrating a MUX/DEMUX with thin film filters, in accordance with an embodiment of the disclosure. Referring to FIG. 2, there is shown a MUX/DEMUX 200 comprising fibers 201, a fiber coupler 203, Rx grating couplers 205A, Tx grating couplers 205B, a lens array 207, and TFF structure 209. The Rx grating couplers 205A may be similar to the grating couplers 117A-117D and the Tx grating couplers 205B may be similar to the grating couplers 117E-117H, for example, shown with respect to FIG. 1.

The fiber coupler 203 may comprise a ferrule for receiving ends of the optical fibers 201 and coupling optical signals into the TFF structure 209 comprising TFFs 209A-209D. Each of the TFFs 209A-209B comprises reflectors for configurable wavelengths, meaning all but a desired wavelength pass through each of the TFFs 209A-209D while the desired wavelength is reflected down toward the lens array 207. In an example scenario, each of the TFFs 209A-209D is configured for a different wavelength, as indicated by wavelengths λ1-λ4 below the grating couplers 205A/205B in the side view of FIG. 2, and may reflect signals whether they are received from the fibers 201 or from the photonics die 250 for coupling into the fibers 201. The TFFs 209A-209D are capable of operating in both a CWDM4 transmitting mode, where optical signals from the photonics die 250 are coupled into one of the fibers 201, and also in a CWDM4 receiving mode where optical signals from the fibers 201 are reflected down to the photonics die 250, although other numbers of Tx and Rx channels are possible. The TFFs 209A-209D may be configured for reduced polarization dependence loss (PDL) at 45 degrees and it may be assumed that the performance at each polarization individually is repeatable and acceptable, but the separation between transfer functions should be considered in structure design.

The lens array 207 may comprise silicon lens structures for focusing optical signals received from the TFFs 209A-209D onto grating couplers 205A situated beneath the array. In addition, the lens array 207 may focus optical signals received from the grating couplers 205A/205B into the TFFS 209A-209D for transmission through one of the fibers 201.

In operation, in a demultiplexing example, CWDM optical signals may be received from one of the fibers 201, where the other fiber is for receiving signals from the photonics die 250, the received signals being coupled into the TFFs 209. Each TFF 209A-209D may reflect an optical signal of one wavelength down to a respective Rx grating coupler 205A, while allowing the other three wavelength optical signals to pass. Each optical signal reflected downward is then focused by the lens array 207 onto the corresponding grating coupler 205A, which then couples the optical signal into a waveguide running parallel to the top surface of the photonics die 250.

For multiplexing, optical signals of different wavelengths λ1-λ4 may be coupled from the Tx grating couplers 205B in the photonics die 250 and focused by the lens array 207 onto a respective TFF 209A-209D. Each TFF then reflects the signal into the Tx fiber of the fibers 201. The TFFs 209A-209D allows each wavelength optical signal to pass through, other than the one reflected from the die 250, thereby generating a CWDM4 optical signal in the fiber.

Figure 3:
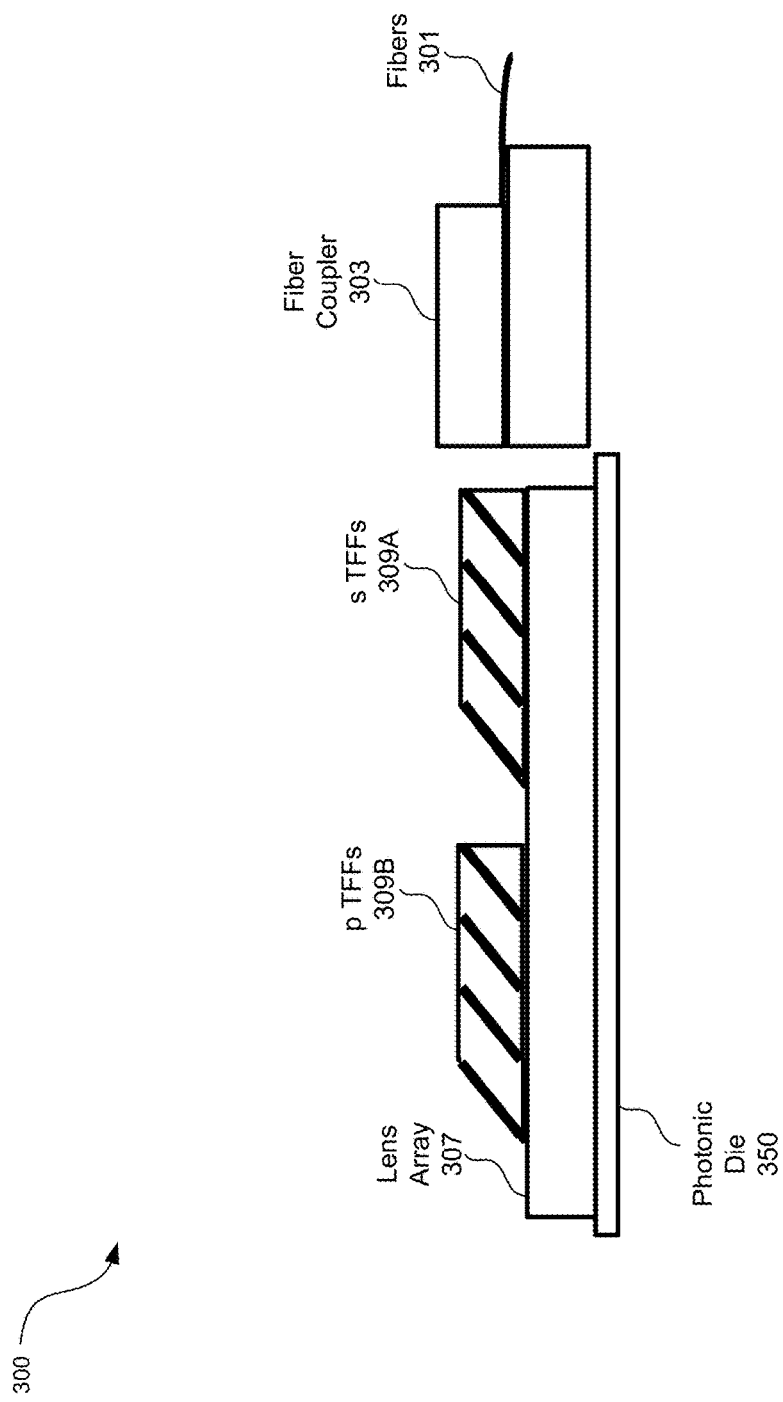
FIG. 3 illustrates optical coupling via different thin film filters for different polarization optical signals, in accordance with an example embodiment of the disclosure.

FIG. 3 illustrates optical coupling via different thin film filters for different polarization optical signals, in accordance with an example embodiment of the disclosure. Referring to FIG. 3, there is shown a CWDM MUX/DEMUX 300 comprising optical fibers 301, a fiber coupler 303, a lens array 307, s-polarization TFFs 309A, p-polarization TFFs 309B, and photonic die 350. Typically, p-polarized light may be understood to have an electric field direction parallel to the plane of incidence on a device, and s-polarized light has the electric field oriented perpendicular to that plane.

The fibers 301, fiber coupler 303, lens array 307, and photonic die 350 may be substantially similar to similarly named structures described above. The s-TFFs 309A comprise thin film filters that are tuned for s-polarization optical signals received either from the fibers 301 or from the photonic die 305, and the p-TFFs 309B comprise thin film filters that are tuned for p-polarization optical signals received either from the fibers 301 or from the photonic die 305.

The deviation in reflection between the s and p polarization can be utilized to an advantage in a CWDM system, with the first 4-filter stack, the s-TFFs 309A, configured for s-polarization optical signals so that each filter is engineered to push the p-polarization out of band, meaning they are not reflected downward. The p-polarizations may then be collected by a second 4-filter stack, the p-TFFs 309B. Transmission of optical signals out of the photonic die 350 may be via the s-TFFs 309A, for example, or both sets of TFFs. In this manner, demultiplexing and multiplexing may be enabled based on polarization dependence of TFFs.

Figure 4:
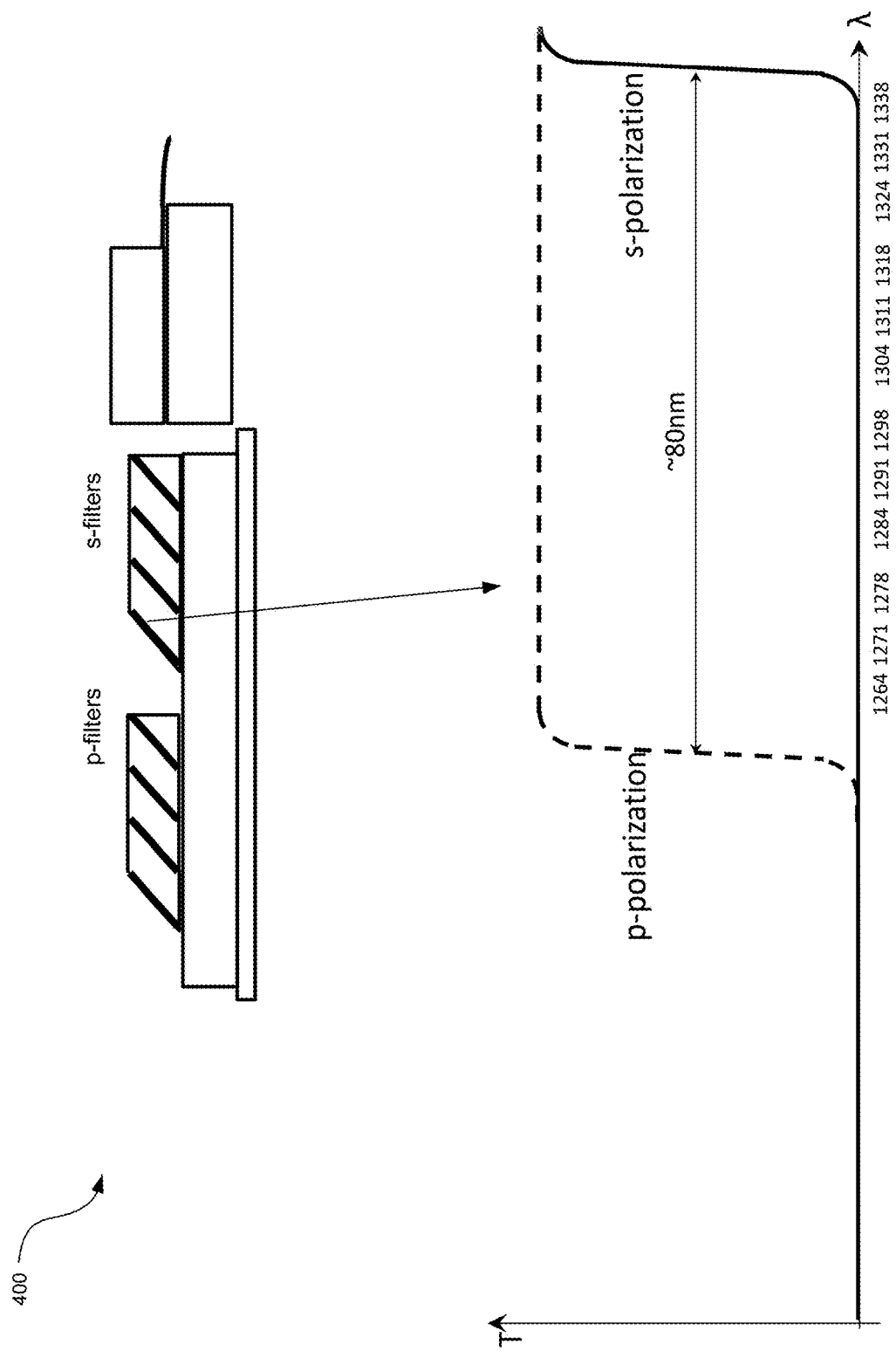
FIG. 4 illustrates spectral response for s-polarization and p-polarization thin film filters, in accordance with an example embodiment of the disclosure.

FIG. 4 illustrates spectral response for s-polarization and p-polarization thin film filters, in accordance with an example embodiment of the disclosure. Referring to FIG. 4, there is shown a CWDM MUX/DEMUX 400, similar to the CWDM MUX/DEMUX 300 described with respect to FIG. 3. By rotating a TFF, the transmission properties for s-polarization are different with respect to p-polarization, as shown by the plot below with ~80 nm difference of the p-polarization transmission spectra for the s-TFFs. Optical signals with p-polarization will pass through the s-TFFs at wavelengths all the way down to ~1260 nm, whereas s-polarized optical signals only down to ~1340 nm. In this embodiment, p-polarization signals from the fibers pass through the s-TFFs while s-polarization signals are reflected downward into the photonic chip. The p-polarization signals are then reflected down to the photonic chip via the p-TFFs.

Figure 5:
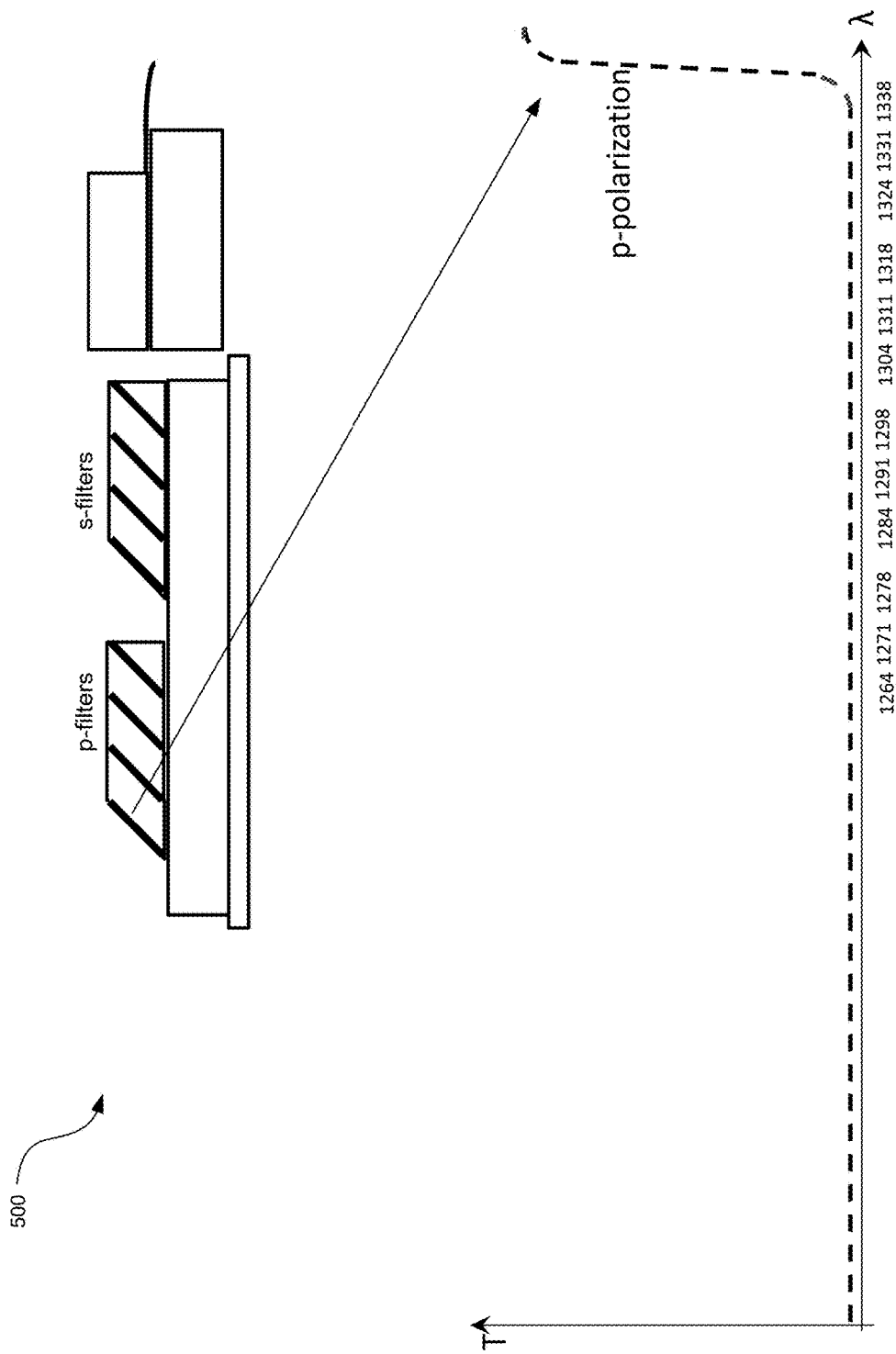
FIG. 5 illustrates spectral response for p-polarization thin film filters, in accordance with an example embodiment of the disclosure.

FIG. 5. Illustrates spectral response for p-polarization thin film filters, in accordance with an example embodiment of the disclosure. Referring to FIG. 5, there is shown a CWDM MUX/DEMUX 500, similar to the CWDM MUX/DEMUX described with previously. The plot below the MUX/DEMUX 500 illustrates the transmission through the last p-TFF, showing that the all p-polarization signals less than ~1338 nm wavelength range will be reflected downward into the photonic chip via the p-TFFs, but since most all of these wavelengths will have been reflected downward by previous TFFs, only the last remaining signal is actually reflected.

Figure 6:
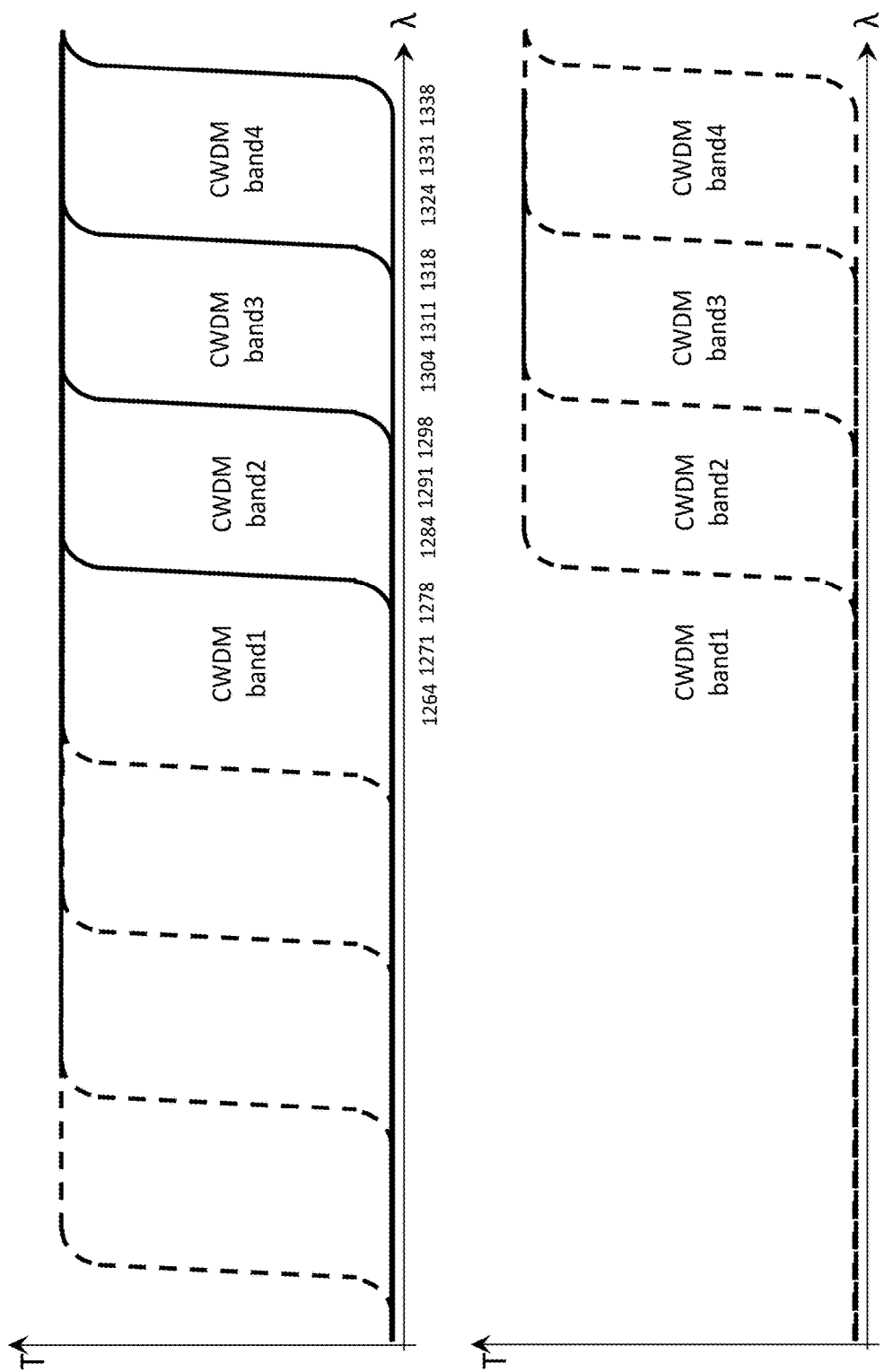
FIG. 6 illustrates spectral response for stacked thin film filters, in accordance with an example embodiment of the disclosure.

FIG. 6 illustrates spectral response for stacked thin film filters, in accordance with an example embodiment of the disclosure. Referring to FIG. 6, there are shown spectral responses for stacked s-TFFs on top and stacked p-TFFs on bottom, where the solid lines in the upper plot represent the transition between transmission/reflection for the s-polarized signal by the s-TFFs, indicating that all the p-polarized signals transmit through the S-TFFs. In the lower plot, the dashed lines represent transmission curves for p-TFFs. The stacked TFFs thus enable four CWDM bands for each polarization. In this manner, CWDM is enabled with configurable polarization and wavelength.

Figure 7:
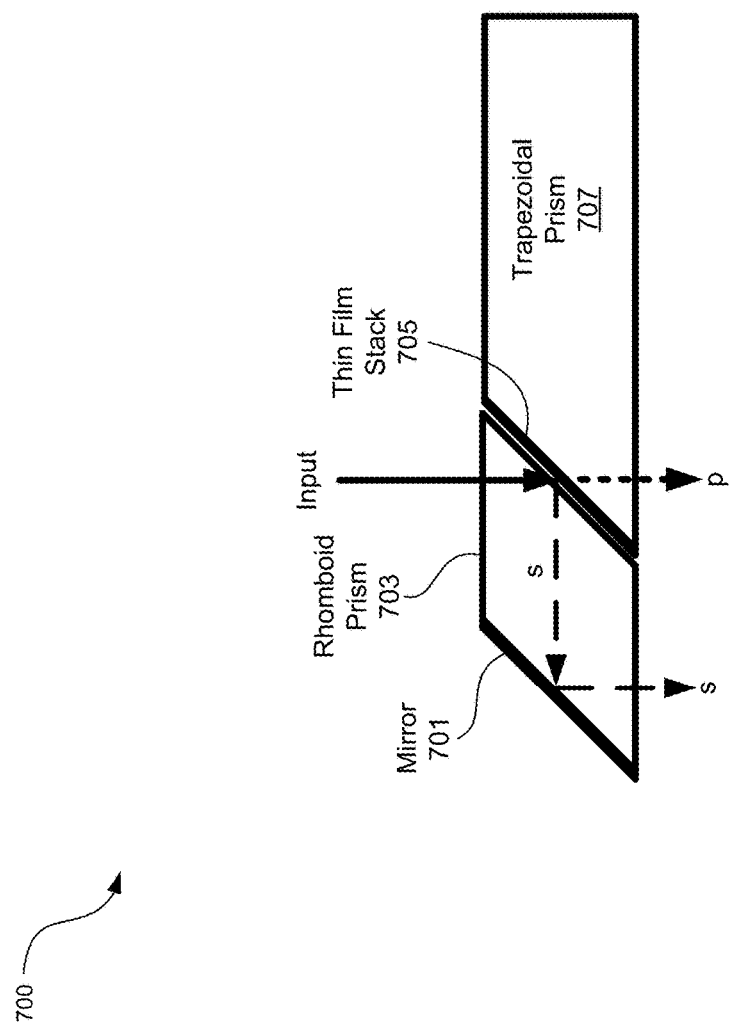
FIG. 7 illustrates a beam splitter for spatially separating different polarizations, in accordance with an example embodiment of the disclosure.

FIG. 7 illustrates a beam splitter for spatially separating different polarizations, in accordance with an example embodiment of the disclosure. Referring to FIG. 7, there is shown a beam splitter 700 comprising a mirror 701 on one surface of a rhomboid prism 703 and a polarization splitting thin film stack 705 on a trapezoidal prism 707. The rhomboid prism 703 and the trapezoidal prism 707 may comprise transparent material on which reflective materials may be formed. Similarly, the thin film stack 705 may be formed on a sloped surface of the trapezoidal prism 707, which may be configured to reflect optical signals of one polarization downward while allowing signals of another polarization to pass through.

In operation, an input optical signal is received in the rhomboid prism 703 where the s-polarization signals may be reflected laterally by the thin film stack 705 and the p-polarization signals may pass through the thin film stack 705 and continue downward to grating couplers in the photonic die. The mirror 701 formed on the rhomboid prism 703 adjacent to the thin film stack reflects the reflected s-polarization signals down to the photonic die. In this manner, the different polarizations are translated spatially from each other, where the displacement beam splitting may be greater than 5 mm if desired.

Figure 8:
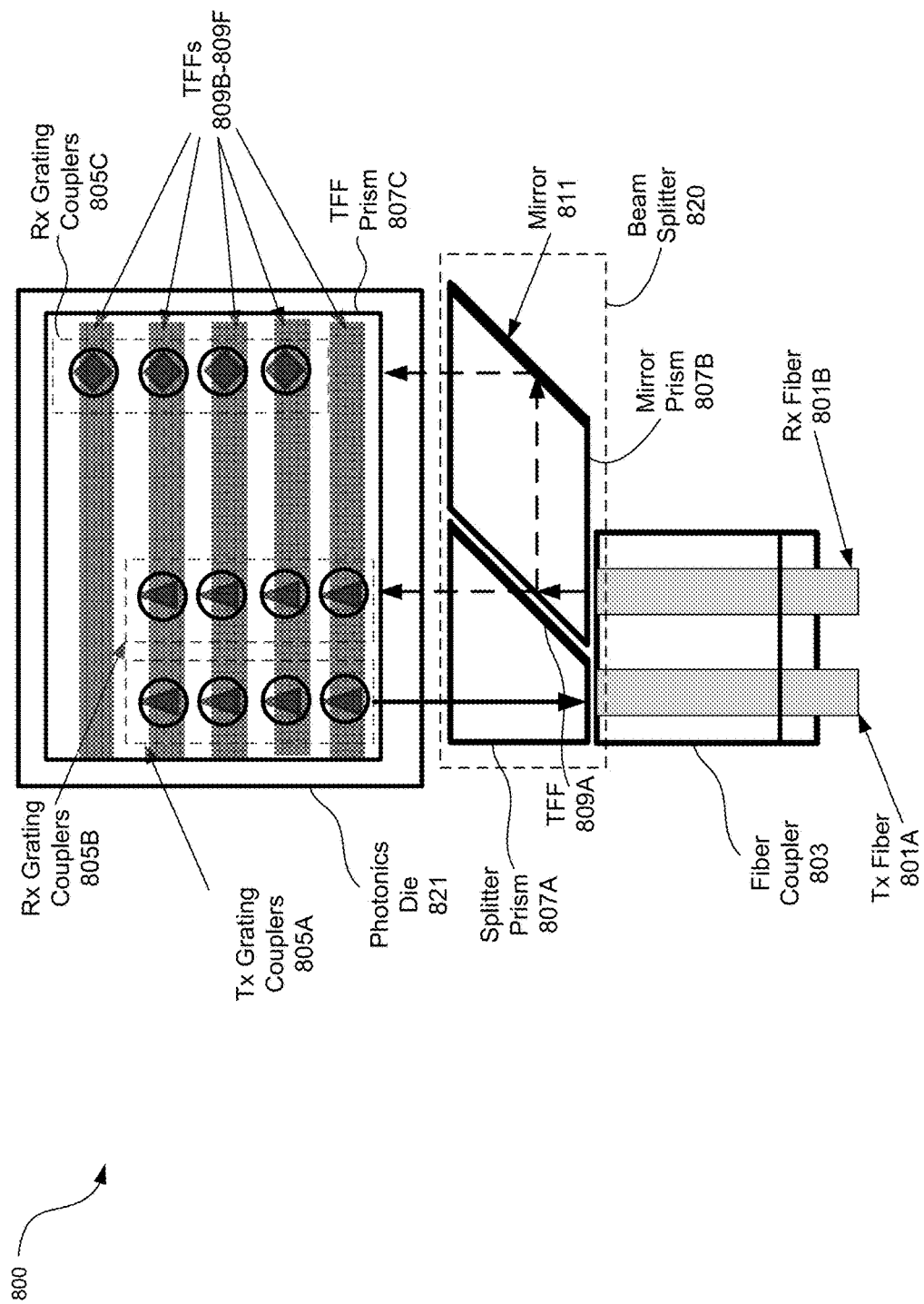
FIG. 8 illustrates an optical transceiver with a spatial separation beam splitter, in accordance with an example embodiment of the disclosure.

FIG. 8 illustrates an optical transceiver with a spatial separation beam splitter, in accordance with an example embodiment of the disclosure. Referring to FIG. 8, there is shown a transceiver 800 comprising Tx fiber 801A, Rx fiber 801B, a fiber coupler 803, a photonics die 821, and beam splitter 820. The photonics die 821 may be similar to the photonic die described earlier with respect to FIGS. 1-7, and may comprise the Tx grating couplers 805A and Rx grating couplers 805B and 805C. In an example scenario, the Tx couplers 805A and Rx grating couplers 805B may comprise single polarization grating couplers and the Rx grating couplers 805C may comprise polarization splitting grating couplers.

The prism 807C may comprise a transparent structure with thin film filters formed on sloped surfaces for reflecting desired signals down to the Rx grating couplers 805B and 805C as well as from the Tx grating couplers 805A to the Tx fiber 801A via the splitter prism 807A. The prism 807A may also have thin films formed on an angled surface thereby forming TFF 809A for splitting signals of different polarizations upon hitting the sloped surface, while mirror prism 807B comprises layers formed on an angled surface to provide a mirror 811 for reflecting signals from the TFF 809A to the Rx grating couplers 805C.

Figure 9:
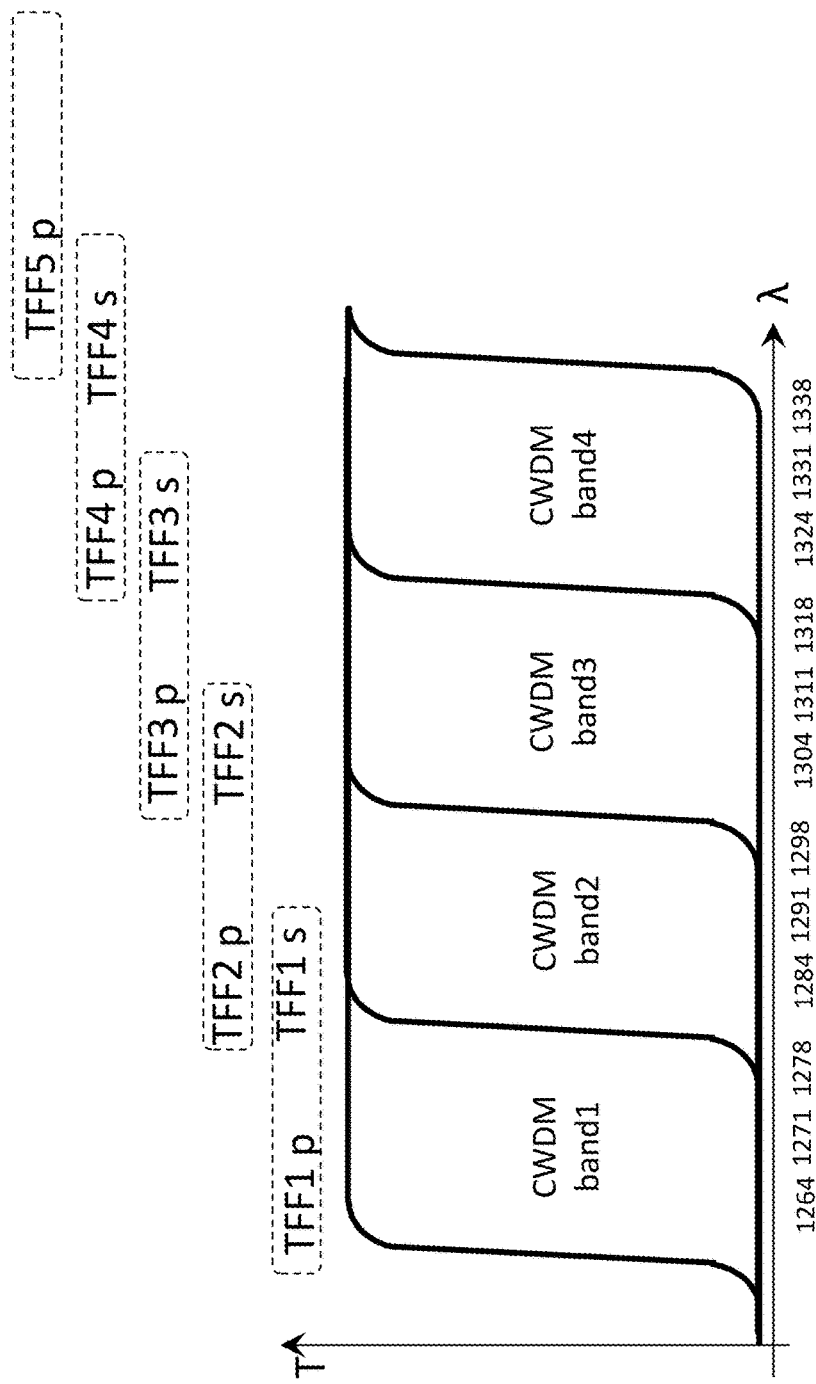
FIG. 9 illustrates the spectral bands for a CWDM stack of thin film filters, in accordance with an example embodiment of the disclosure.

The transceiver 800 incorporates the beam splitter 820 comprising the TFF 809A in the splitter prism 807A and the mirror 811 in the mirror prism 807B to spatially separate signals of different polarizations, such that the different Rx grating couplers 805B and 805C may be utilized for different polarizations and wavelengths from a single received CWDM signal. In addition, the transceiver comprises a $5^{th}$ TFF for the $4^{th}$ p-polarization, as illustrated in FIG. 9.

Each TFF 809B-809F may be designed to reflect the s-polarization of one CWDM band and p-polarization of the previous CWDM band while allowing all others to pass through. This uses the same approach as the previous implementation of FIG. 7, where the band-edges of the p- and s-polarization transmissions are deliberately separated. In this example, the delta between them is set to 20 nm (CWDM channel spacing). The delay between the two polarizations can be readily compensated on silicon, such as with a few hundred microns of extra waveguide length on one side, for example.

In operation, the transceiver 800 is operable to receive and transmit CWDM4 signals through the use of spatially separated polarization splitters and wavelength sensitive thin film filters. Four optical signals at different CWDM wavelengths may be generated in the photonics die 821, such as described previously, and coupled out of the die via the Tx grating couplers 805A. The TFFs 809B-809F reflect each of the signals out of the TFF prism 807C into the splitter prism 807A and into the Tx fiber 801A, thereby generating a CWDM4 signal transmitted into the fiber 801A.

Similarly, a CWDM signal may be received via the Rx fiber 801B and coupled to the beam splitter 820 where one polarization passes through the TFF 809A to the TFF prism 807C, where each of the TFFs 809B-809F reflects a particular wavelength and polarization signal down to the Rx grating couplers 805B, which couple the corresponding wavelength signal into the photonic die 821 for processing. The other polarization signals at the TFF 809A are reflected laterally to the mirror 811, which reflects the signals into the TFF prism 807C, where the TFFs 809B-809F each reflect a specific wavelength and polarization signal down to the Rx grating couplers 805C, which couple the signals into the photonics die 821 for processing.

FIG. 9 illustrates the spectral bands for a CWDM stack of thin film filters, in accordance with an example embodiment of the disclosure. Referring to FIG. 9, there are shown stacked TFF spectral bands, showing band 1 through band 4, for a CWDM4 application, ranging from 1264-1338 nm. Each filter may be tuned to reflect the s-polarization of one CWDM band and the p-polarization of the previous CWDM band. Therefore, the first TFF may reflect the p-polarization for band 1 and the s-polarization for band 2, the second TFF for the p-polarization of band 2 and the s-polarization for band 3, and so on. In this manner, five TFFs may be utilized for 8 CWDM signals.

Figure 10:
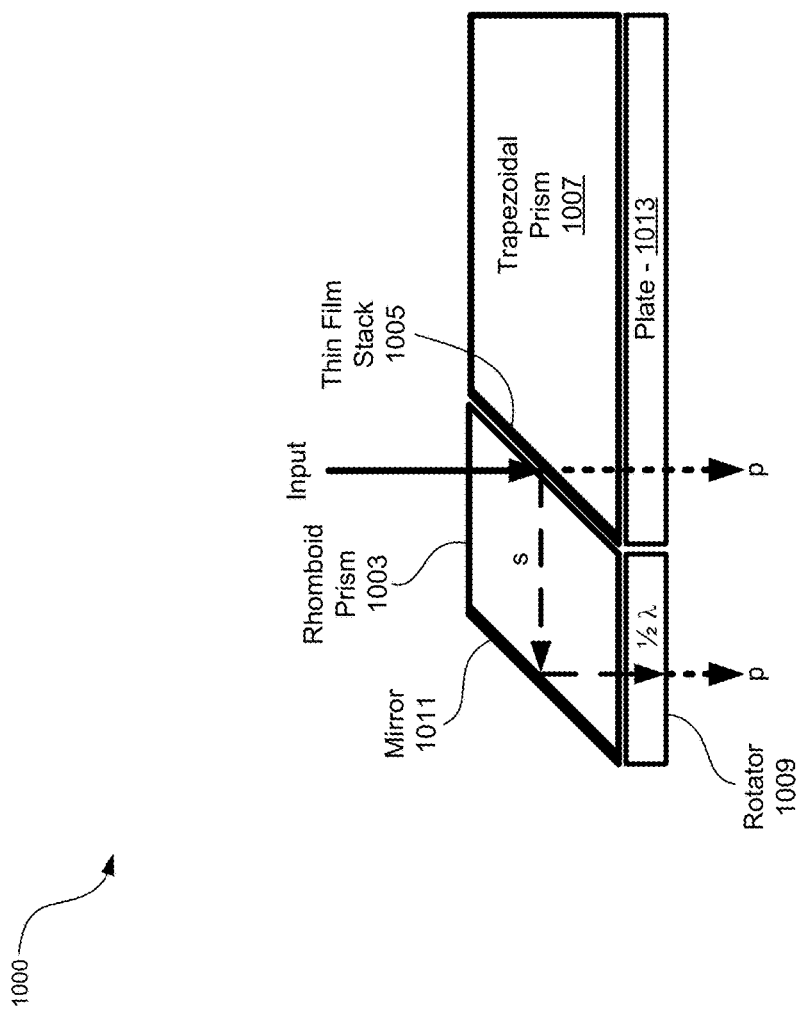
FIG. 10 illustrates a beam splitter with a polarization rotator, in accordance with an example embodiment of the disclosure.

FIG. 10 illustrates a beam splitter with a polarization rotator, in accordance with an example embodiment of the disclosure. Referring to FIG. 10, there is shown a beam splitter 1000 with polarization rotation, the beam splitter comprising a mirror 1011 formed on an angled surface of rhomboid prism 1003, a polarization splitting thin film stack 1005 on trapezoidal prism 1007, a polarization rotator 1009, and a plate 1013. The mirror 1001, prisms 1003 and 1007, and thin film stack 1005 may be similar to elements described with respect to FIG. 7.

In addition, a half-wave plate oriented at 45 degrees to the input signal formed or mounted below the mirror rotates the polarization so that only a single polarization, p-polarization in this example, is incident on the photonic die. The polarization rotator 1009 may comprise ½ wavelength polarization rotator plate where an incoming signal at one surface may be rotated by 90 degrees upon exiting from the opposite surface. For example, an s-polarized signal would be p-polarized upon traveling through the rotator 1009. Finally, a glass plate 1013 may be placed adjacent to the half-wave plate polarization rotator 1009 to planarize the bottom of the beam splitter 1000.

In operation, an input optical signal comprising s- and p-polarized signals may be received in the rhomboid prism 1003 such that it hits the thin film stack 1005, which reflects the s-polarization signals laterally and transmits the p-polarization signals downward to grating couplers in the photonic die through the polarization rotator 1009. The mirror 1011 formed on the rhomboid prism 1003 adjacent to the thin film stack 1005 reflects the reflected s-polarization signals down to the photonic die, resulting in laterally displaced signals.

Figure 11:
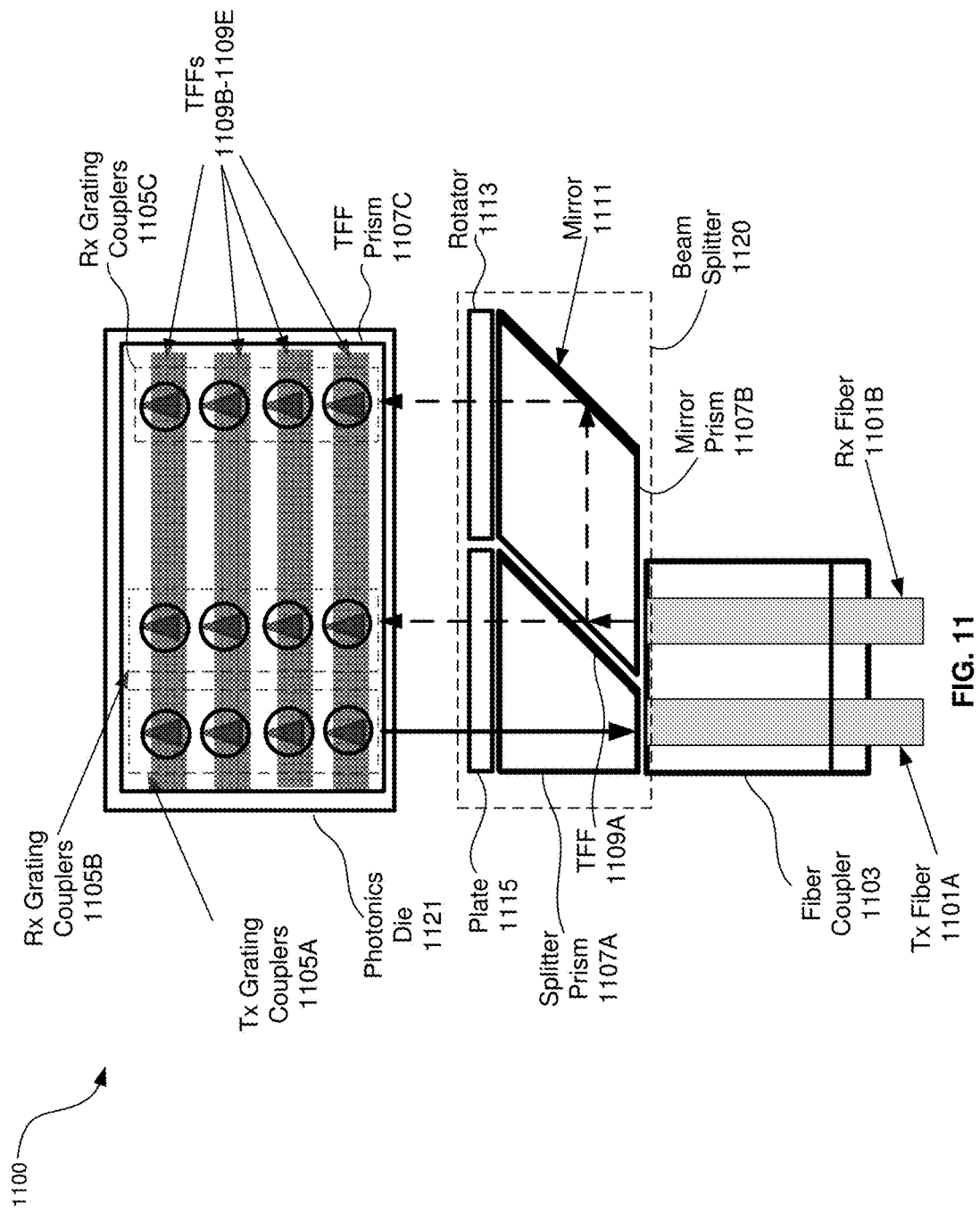
FIG. 11 illustrates an optical transceiver with a spatial separation beam splitter and polarization rotator, in accordance with an example embodiment of the disclosure.

FIG. 11 illustrates an optical transceiver with a spatial separation beam splitter and polarization rotator, in accordance with an example embodiment of the disclosure. Referring to FIG. 11, there is shown transceiver 1100 comprising Tx fiber 1101A, Rx fiber 1101B, photonics die 1121, beam splitter 1120, and a fiber coupler 1103.

The beam splitter 1120 may comprise TFF 1109A on an angled surface of splitter prism 1107A, mirror 1111 on an angled surface of mirror prism 1107B, and a rotator 1113 adjacent to the mirror prism 1107B. The rotator 1113 may comprise a half-wave plate, for example, for rotating the polarization of the s-polarization to that of the p-polarization at the TFF 1109A. A glass plate 1115 may be placed adjacent to the half-wave plate polarization rotator 1113 to planarize the surface of the beam splitter 1120 coupled to the TFF prism 1107C.

The photonic die 1121 may comprise Tx grating couplers 1105A and Rx grating couplers 1105B and 1105C. In an example scenario, the grating couplers 1105A-1105C comprise single polarization grating couplers, as opposed to a combination of single polarization and polarization splitting grating couplers, which may provide lower coupling efficiency.

The input signal comprising signals of different wavelength and polarization from the Rx fiber 1101B, may be split into p-polarization signals transmitting through the polarization splitting TFF 1109A, through the plate 1115, and to the TFF prism 1107C. S-polarized signals may be reflected towards the mirror 1111, which then reflects them to the rotator 1113, which rotates the signals to p-polarization signals that are coupled to the TFF prism 1107C. Therefore, only p-polarization signals are transmitted out of the beam splitter 1120, which due to the orientation of the TFF 1109A, are s-polarized at the surface of the filters. Due to the rotation of the optical signals by the rotator 1113 resulting in all signals having the same polarization coming out of the beam splitter 1120, single polarization grating couplers may be utilized throughout the transceiver 1100, as opposed to utilizing polarization splitting grating couplers with lower coupling efficiency.

The transceiver 1100 incorporates the spatially separating beam splitter 1120, such that different Rx grating couplers 1105A may be utilized for different wavelengths. The delay between the different p-polarization signals at the surface of the photonics die 1121 may be readily compensated on silicon, such as with a few hundred microns of extra waveguide length on one side, for example.

Since PSGCs can be replaced by SPGCs throughout the transceiver 1100, a significant improvement in Rx insertion loss may be demonstrated. This benefit is obtained irrespective of the exact implementation of the transceiver 1100.

Figure 12:
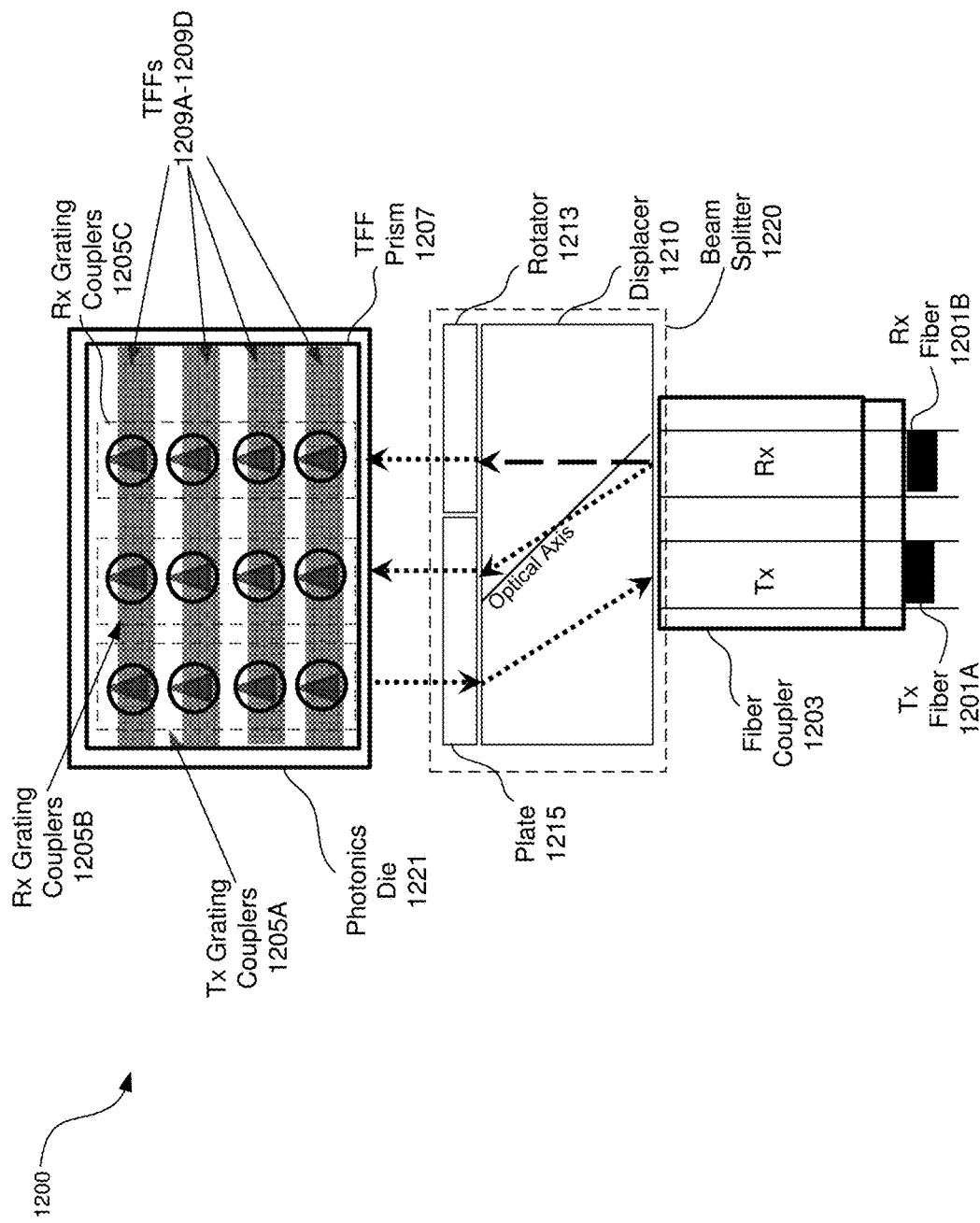
FIG. 12 illustrates an optical transceiver with a single polarization MUX/DEMUX with beam displacers, in accordance with an example embodiment of the disclosure.

FIG. 12 illustrates an optical transceiver with a single polarization MUX/DEMUX with beam displacer, in accordance with an example embodiment of the disclosure. Referring to FIG. 12, there is shown transceiver 1200 comprising Tx fiber 1201A, Rx fiber 1201B, a fiber coupler 1203, displacer 1210, TFF prism 1207, and photonics die 1221.

The photonics die 1221 may comprise Tx grating couplers 1205A and Rx grating couplers 1205B and 1205C. The TFF prism 1207 may comprise TFFs 1209A-1209D for reflecting optical signals of a specific wavelength down to the Rx grating couplers 1205B and 1205C, as well as to reflect optical signals received from the Tx grating couplers 1205A to the beam splitter 1220.

The beam splitter 1220 may comprise a beam displacer 1210, a rotator 1213, and a plate 1215, all in an optically transparent material. In the example shown in FIG. 12, polarization separation is accomplished by using the beam displacer 1210, which may comprise a plate comprising a strongly birefringent crystal, such as yttrium orthovanadate (YVO4), with an optical axis at 45 degrees as shown. This crystal refracts the s-polarization laterally with respect to the p-polarization signal, which passes straight through to the half-wave plate rotator 1213, resulting in s-polarization signals out of the beam splitter 1220.

The rotator 1213 may comprise a half-wave plate, for example, for rotating the polarization of the p-polarization signal s-polarization. Due to the rotation of the s-polarization signal to p-polarization via the rotator 1213, single polarization grating couplers may be utilized as opposed to polarization splitting grating couplers.

The transceiver 1200 incorporates the spatially separating beam splitter 1220, such that different Rx grating couplers 1205B and 1205C may be utilized for different wavelengths. The delay between the laterally displaced signals at the surface of the photonics die 1221 may be readily compensated on silicon, such as with a few hundred microns of extra waveguide length on one side, for example.

In an example embodiment of the disclosure, a method and system is described for eliminating polarization dependence for 45 degree incidence MUX/DEMUX designs. The system may comprise an optical transceiver, where the optical transceiver comprises an input optical fiber, a beam splitter, and a plurality of thin film filters coupled to a photonics die, and where the thin film filters are arranged above corresponding grating couplers in the photonics die.

The transceiver may be operable to receive an input optical signal comprising a plurality of different wavelength signals via the input optical fiber, split the input optical signal into signals of a first polarization and signals of a second polarization using the beam splitter by separating the signals of the second polarization laterally from the signals of the first polarization, communicate the signals of the first polarization and the second polarization to the plurality of thin film filters, and reflect signals of each of the plurality of different wavelength signals to corresponding grating couplers in the photonics die using the thin film filters. Optical signals may be communicated at a plurality of wavelengths out of the photonics die to the thin film filters.

Each of the optical signals from the photonics die may be reflected to the beam splitter using the thin film filters. The reflected optical signals from the photonics die may be communicated to an output fiber of the optical transceiver. Each of the thin film filters may be configured to reflect optical signals of the first polarization at a first wavelength and signals of the second polarization at a second wavelength. The beam splitter may comprise a thin film stack on an angled surface of a first prism, with the thin film stack being configured to reflect signals of the second polarization while allowing signals of the first polarization to pass through.

The separated signals of the second polarization may be communicated to the plurality of thin film filters using a mirror in the beam splitter formed on an angled surface of a second prism adjacent to the first prism. A polarization of the reflected signals of the second polarization may be rotated using a polarization rotator on the second prism before being communicated to the plurality of thin film filters. The signals of the second polarization may be separated laterally from the signals of the first polarization using a birefringent material. The birefringent material may allow signals of the first polarization to pass directly through to the plurality of thin film filters.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an optical transceiver, the optical transceiver comprising an input optical fiber, a beam splitter, and a plurality of thin film filters coupled to a photonics die, the thin film filters being arranged above corresponding grating couplers in the photonics die:
      receiving an input optical signal comprising a plurality of different wavelength signals via the input optical fiber;
      splitting the input optical signal into signals of a first polarization and signals of a second polarization using the beam splitter by separating the signals of the second polarization laterally from the signals of the first polarization;
      communicating the signals of the first polarization and the second polarization to the plurality of thin film filters; and
      communicating signals of each of the plurality of different wavelength signals to corresponding grating couplers in the photonics die using the thin film filters, wherein each of the thin film filters is configured to reflect optical signals of the first polarization at a first wavelength and signals of the second polarization at a second wavelength.

2. The method according to claim 1, comprising communicating optical signals at a plurality of wavelengths out of the photonics die to the thin film filters.

3. The method according to claim 2, comprising reflecting each of the optical signals from the photonics die to the beam splitter using the thin film filters.

4. The method according to claim 3, comprising communicating the reflected optical signals from the photonics die to an output fiber of the optical transceiver.

5. The method according to claim 1, wherein the beam splitter comprises a thin film stack on an angled surface of a first prism, the thin film stack being configured to reflect signals of the second polarization while allowing signals of the first polarization to pass through.

6. The method according to claim 5, comprising communicating the separated signals of the second polarization to the plurality of thin film filters using a mirror in the beam splitter formed on an angled surface of a second prism adjacent to the first prism.

7. The method of claim 6, comprising rotating a polarization of the reflected signals of the second polarization using a polarization rotator on the second prism before being communicated to the plurality of thin film filters.

8. The method of claim 1, comprising separating the signals of the second polarization laterally from the signals of the first polarization using a birefringent material.

9. The method of claim 8, wherein the birefringent material allows signals of the first polarization to pass directly through to the plurality of thin film filters.

10. The method of claim 9, comprising rotating polarization of the signals of the first polarization after passing through the birefringent material.

11. A system for communication, the system comprising:
    an optical transceiver, the optical transceiver comprising an input optical fiber, a beam splitter, and a plurality of thin film filters coupled to a photonics die, the thin film filters being arranged above corresponding grating couplers in the photonics die, the optical transceiver being operable to:
    receive an input optical signal comprising a plurality of different wavelength signals via the input optical fiber;
    split the input optical signal into signals of a first polarization and signals of a second polarization using the beam splitter by separating the signals of the second polarization laterally from the signals of the first polarization;
    communicate the signals of the first polarization and the second polarization to the plurality of thin film filters; and
    communicate signals of each of the plurality of different wavelength signals to corresponding grating couplers in the photonics die using the thin film filters, wherein each of the thin film filters is configured to reflect optical signals of the first polarization at a first wavelength and signals of the second polarization at a second wavelength.

12. The system according to claim 11, wherein the optical transceiver is operable to communicate optical signals at a plurality of wavelengths out of the photonics die to the thin film filters.

13. The system according to claim 12, wherein the optical transceiver is operable to reflect each of the optical signals from the photonics die to the beam splitter using the thin film filters.

14. The system according to claim 13, wherein the optical transceiver is operable to communicate the reflected optical signals from the photonics die to an output fiber of the optical transceiver.

15. The system according to claim 11, wherein the beam splitter comprises a thin film stack on an angled surface of a first prism, the thin film stack being configured to reflect signals of the second polarization while allowing signals of the first polarization to pass through.

16. The system according to claim 15, wherein the optical transceiver is operable to communicate the separated signals of the second polarization to the plurality of thin film filters using a mirror in the beam splitter formed on an angled surface of a second prism adjacent to the first prism.

17. The system according to claim 16, wherein the optical transceiver is operable to rotate a polarization of the reflected signals of the second polarization using a polarization rotator on the second prism before being communicated to the plurality of thin film filters.

18. The system according to claim 11, wherein the optical transceiver is operable to separate the signals of the second polarization laterally from the signals of the first polarization using a birefringent material which allows signals of the first polarization to pass directly through to the plurality of thin film filters.

19. The system according to claim 11, wherein the optical transceiver is operable to rotate polarization of the signals of the first polarization after passing through the birefringent material.

20. A system for communication, the system comprising:
an optical transceiver, the optical transceiver comprising a photonics die, an input optical fiber and a plurality of thin film filters, the plurality of thin film filters being arranged above corresponding grating couplers in the photonics die, the optical transceiver being operable to:
receive an input optical signal comprising a plurality of different wavelength signals via the input optical fiber;
communicate the input optical signal to the plurality of thin film filters; and
reflect a signal of each of the plurality of different wavelength signals to a corresponding grating coupler in the photonics die using the thin film filters, wherein each of the thin film filters is configured to reflect optical signals of the first polarization at a first wavelength and signals of the second polarization at a second wavelength.

21. A method for communication, the method comprising:
in an optical transceiver, the optical transceiver comprising an input optical fiber, a beam splitter, and a plurality of thin film filters coupled to a photonics die, the thin film filters being arranged above corresponding grating couplers in the photonics die:
receiving an input optical signal comprising a plurality of different wavelength signals via the input optical fiber;
splitting the input optical signal into signals of a first polarization and signals of a second polarization using the beam splitter by separating the signals of the second polarization laterally from the signals of the first polarization;
communicating the signals of the first polarization and the second polarization to the plurality of thin film filters;
communicating signals of each of the plurality of different wavelength signals to corresponding grating couplers in the photonics die using the thin film filters;
communicating optical signals at a plurality of wavelengths out of the photonics die to the thin film filters; and
reflecting each of the optical signals from the photonics die to the beam splitter using the thin film filters.

22. The method according to claim 21, comprising communicating the reflected optical signals from the photonics die to an output fiber of the optical transceiver.

23. The method according to claim 21, wherein the beam splitter comprises a thin film stack on an angled surface of a first prism, the thin film stack being configured to reflect signals of the second polarization while allowing signals of the first polarization to pass through.

24. The method according to claim 23, comprising communicating the separated signals of the second polarization to the plurality of thin film filters using a mirror in the beam splitter formed on an angled surface of a second prism adjacent to the first prism.

25. The method of claim 24, comprising rotating a polarization of the reflected signals of the second polarization using a polarization rotator on the second prism before being communicated to the plurality of thin film filters.

26. The method of claim 21, comprising separating the signals of the second polarization laterally from the signals of the first polarization using a birefringent material.

27. The method of claim 26, wherein the birefringent material allows signals of the first polarization to pass directly through to the plurality of thin film filters.

28. The method of claim 27, comprising rotating polarization of the signals of the first polarization after passing through the birefringent material.

29. A system for communication, the system comprising:
an optical transceiver, the optical transceiver comprising an input optical fiber, a beam splitter, and a plurality of thin film filters coupled to a photonics die, the thin film filters being arranged above corresponding grating couplers in the photonics die, the optical transceiver being operable to:
receive an input optical signal comprising a plurality of different wavelength signals via the input optical fiber;
split the input optical signal into signals of a first polarization and signals of a second polarization using the beam splitter by separating the signals of the second polarization laterally from the signals of the first polarization;
communicate the signals of the first polarization and the second polarization to the plurality of thin film filters;
communicate signals of each of the plurality of different wavelength signals to corresponding grating couplers in the photonics die using the thin film filters;
communicate optical signals at a plurality of wavelengths out of the photonics die to the thin film filters; and
reflect each of the optical signals from the photonics die to the beam splitter using the thin film filters.

30. The system according to claim 29, wherein the optical transceiver is operable to communicate the reflected optical signals from the photonics die to an output fiber of the optical transceiver.

31. The system according to claim 29, wherein each of the thin film filters is configured to reflect optical signals of the first polarization at a first wavelength and signals of the second polarization at a second wavelength.

32. The system according to claim 29, wherein the beam splitter comprises a thin film stack on an angled surface of a first prism, the thin film stack being configured to reflect signals of the second polarization while allowing signals of the first polarization to pass through.

33. The system according to claim 32, wherein the optical transceiver is operable to communicate the separated signals of the second polarization to the plurality of thin film filters using a mirror in the beam splitter formed on an angled surface of a second prism adjacent to the first prism.

34. The system according to claim 33, wherein the optical transceiver is operable to rotate a polarization of the reflected signals of the second polarization using a polarization rotator on the second prism before being communicated to the plurality of thin film filters.

35. The system according to claim 29, wherein the optical transceiver is operable to separate the signals of the second polarization laterally from the signals of the first polarization using a birefringent material which allows signals of the first polarization to pass directly through to the plurality of thin film filters.

36. The system according to claim 29, wherein the optical transceiver is operable to rotate polarization of the signals of the first polarization after passing through the birefringent material.

37. A method for communication, the method comprising:
in an optical transceiver, the optical transceiver comprising an input optical fiber, a beam splitter, and a plurality of thin film filters coupled to a photonics die, the thin film filters being arranged above corresponding grating couplers in the photonics die:
receiving an input optical signal comprising a plurality of different wavelength signals via the input optical fiber;
splitting the input optical signal into signals of a first polarization and signals of a second polarization using the beam splitter by separating the signals of the second polarization laterally from the signals of the first polarization;
communicating the signals of the first polarization and the second polarization to the plurality of thin film filters; and
communicating signals of each of the plurality of different wavelength signals to corresponding grating couplers in the photonics die using the thin film filters, wherein the beam splitter comprises a thin film stack on an angled surface of a first prism, the thin film stack being configured to reflect signals of the second polarization while allowing signals of the first polarization to pass through.

38. The method according to claim 37, comprising communicating optical signals at a plurality of wavelengths out of the photonics die to the thin film filters.

39. The method according to claim 37, comprising communicating the separated signals of the second polarization to the plurality of thin film filters using a mirror in the beam splitter formed on an angled surface of a second prism adjacent to the first prism.

40. The method of claim 39, comprising rotating a polarization of the reflected signals of the second polarization using a polarization rotator on the second prism before being communicated to the plurality of thin film filters.

41. The method according to claim 37, comprising separating the signals of the second polarization laterally from the signals of the first polarization using a birefringent material.

42. The method of claim 41, wherein the birefringent material allows signals of the first polarization to pass directly through to the plurality of thin film filters.

43. The method of claim 42, comprising rotating polarization of the signals of the first polarization after passing through the birefringent material.

44. A system for communication, the system comprising:
an optical transceiver, the optical transceiver comprising an input optical fiber, a beam splitter, and a plurality of thin film filters coupled to a photonics die, the thin film filters being arranged above corresponding grating couplers in the photonics die, the optical transceiver being operable to:
receive an input optical signal comprising a plurality of different wavelength signals via the input optical fiber;
split the input optical signal into signals of a first polarization and signals of a second polarization using the beam splitter by separating the signals of the second polarization laterally from the signals of the first polarization;
communicate the signals of the first polarization and the second polarization to the plurality of thin film filters; and
communicate signals of each of the plurality of different wavelength signals to corresponding grating couplers in the photonics die using the thin film filters, wherein the beam splitter comprises a thin film stack on an angled surface of a first prism, the thin film stack being configured to reflect signals of the second polarization while allowing signals of the first polarization to pass through.

45. The system according to claim 44, wherein the optical transceiver is operable to communicate optical signals at a plurality of wavelengths out of the photonics die to the thin film filters.

46. The system according to claim 44, wherein the optical transceiver is operable to communicate the separated signals of the second polarization to the plurality of thin film filters using a mirror in the beam splitter formed on an angled surface of a second prism adjacent to the first prism.

47. The system according to claim 46, wherein the optical transceiver is operable to rotate a polarization of the reflected signals of the second polarization using a polarization rotator on the second prism before being communicated to the plurality of thin film filters.

48. The system according to claim 44, wherein the optical transceiver is operable to separate the signals of the second polarization laterally from the signals of the first polarization using a birefringent material which allows signals of the first polarization to pass directly through to the plurality of thin film filters.

49. The system according to claim 44, wherein the optical transceiver is operable to rotate polarization of the signals of the first polarization after passing through the birefringent material.

* * * * *